(12) United States Patent
Hansen

(10) Patent No.: US 9,305,174 B2
(45) Date of Patent: *Apr. 5, 2016

(54) ELECTRONIC CLIPBOARD PROTECTION

(71) Applicant: Robert Hansen, Austin, TX (US)

(72) Inventor: Robert Hansen, Austin, TX (US)

(*) Notice: Subject to any disclaimer, the term of this patent is extended or adjusted under 35 U.S.C. 154(b) by 191 days.

This patent is subject to a terminal disclaimer.

(21) Appl. No.: 13/859,679

(22) Filed: Apr. 9, 2013

(65) Prior Publication Data

US 2014/0304839 A1    Oct. 9, 2014

(51) Int. Cl.
*G06F 17/30* (2006.01)
*G06F 7/04* (2006.01)
*H04N 7/16* (2011.01)
*G06F 21/62* (2013.01)

(52) U.S. Cl.
CPC .................. *G06F 21/6209* (2013.01)

(58) Field of Classification Search
CPC .... G06F 21/629; G06F 21/6209; G06F 21/62
USPC .......... 713/168–174, 182–186, 202; 709/206, 709/225, 229, 249, 389; 726/2–8
See application file for complete search history.

(56) References Cited

U.S. PATENT DOCUMENTS

| 6,553,466 | B1 | 4/2003 | Friedman et al. | |
|---|---|---|---|---|
| 7,484,245 | B1 | 1/2009 | Friedman et al. | |
| 2008/0256601 | A1* | 10/2008 | Dutta | G06F 21/554 726/3 |
| 2009/0077383 | A1* | 3/2009 | de Monseignat | H04L 63/0823 713/175 |

FOREIGN PATENT DOCUMENTS

| WO | 2007-087558 | 8/2007 |
|---|---|---|
| WO | 2010-087678 | 8/2010 |

* cited by examiner

*Primary Examiner* — Evans Desrosiers
(74) *Attorney, Agent, or Firm* — Mark R. Hennings

(57) ABSTRACT

A clipboard in an electronic system protects sensitive data by copying data into a clipboard of an electronic system as an entry and selectively blocking access to the sensitive data. An entry protect status is associated with a clipboard entry that is arranged to store copied data that is sensitive. The entry protect status is changed to indicate the entry protect status is set to block access to the copied data. Access to the copied data for which the entry protect status has been changed is selectively blocked.

20 Claims, 5 Drawing Sheets

ELECTRONIC CLIPBOARD PROTECTION

BACKGROUND

An internet browser is an example of a network-enabled application that allows users to easily browse and select items being viewed using the browser. The network-enabled application receives one or more communications (such as webpages) from a service provider that is often encoded in the form of a markup language (such as the hypertext markup language HTML), which describes the structure and functionality of the content that is received by the content user.

The communication (such as a received webpage) often solicits sensitive information such as financial information (e.g., credit card numbers) and/or authentication information (username/password combinations) that the user is to provide (in exchange for goods or services, for example). Because of the length of the information and/or the difficulties in remembering or entering the information, users often rely upon a copying of the information via an electronic clipboard (which includes a cut-and-paste buffer) from a document containing the information to an entry field for receiving and transmitting the entered sensitive information to the service provider.

However, malware that is normally hidden in the network-enabled application (and/or computer upon which the network-enabled application is executing) can exploit the sensitive information (which is typically stored as plaintext in the clipboard) by performing a "paste" operation to itself. The malware can then transmit the information via the established network link to third parties ostensibly for the purpose of making (e.g., illegal) use of the exploited information.

DETAILED DESCRIPTION

The following discussion is directed to various exemplary embodiments of the disclosure. Although one or more of these exemplary embodiments may be preferred, the exemplary embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical, optical and/or wireless connection. Thus, if a first device couples to a second device, that connection can be made through a direct connection, or through an indirect connection via other devices and connections.

Figure 1:
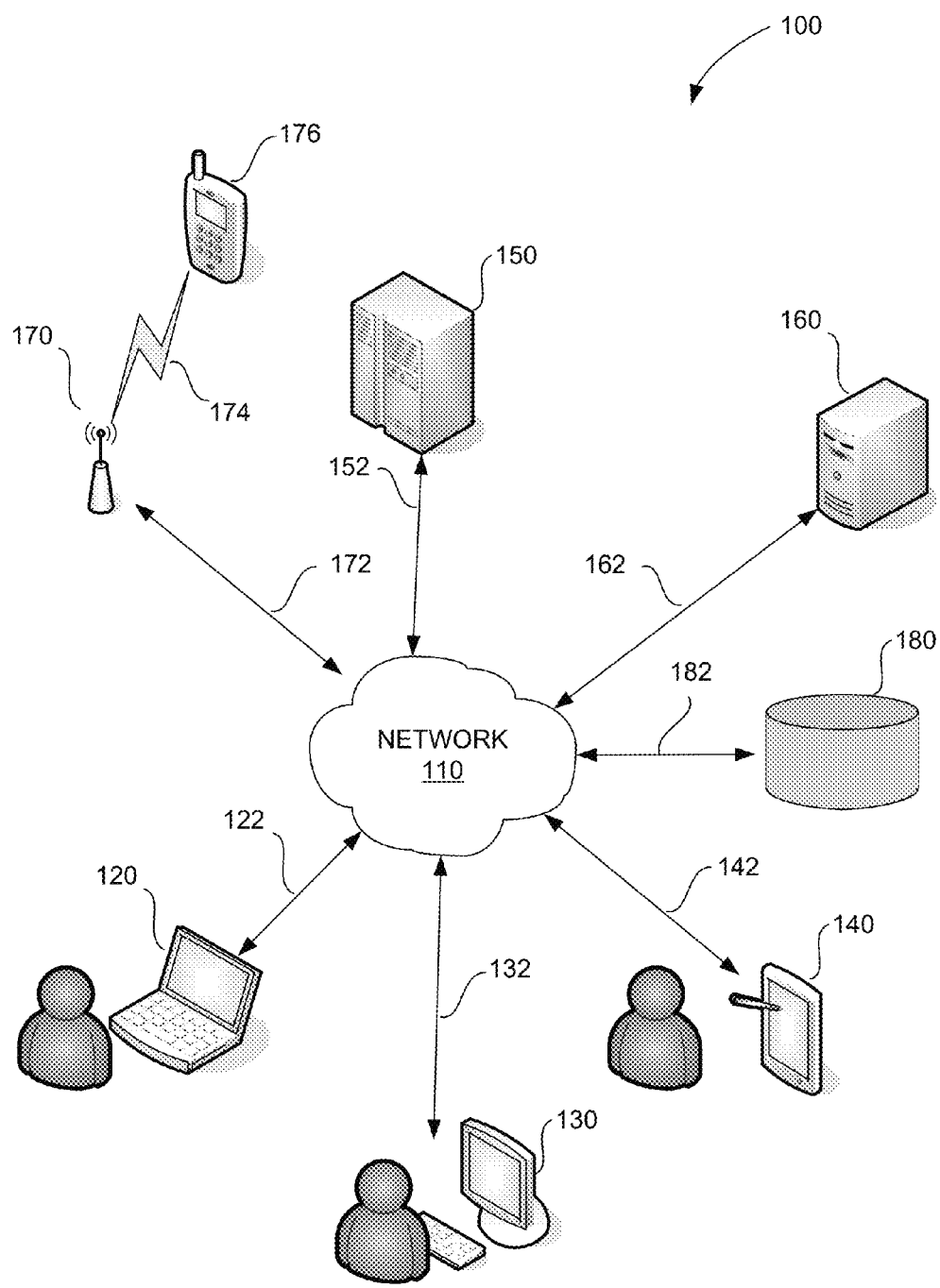
FIG. 1 is a network diagram illustrating a network that is suitable for practicing aspects of clipboard protection in accordance with exemplary embodiments of the disclosure.

FIG. 1 is a network diagram illustrating a network that is suitable for practicing aspects of clipboard protection in accordance with exemplary embodiments of the disclosure. Network system 100 includes consumers 120, 130, and 140 (for example), service provider 150, third party resource provider 160, cellular communications provider 170, and data storage provider 180. Consumers 120, 130, and 140 access and communicate with network 110 using communication links 122, 132, and 142 respectively. Each of the consumers 120, 130, and 140 can be (or internally provide functions of) the (illustrative) computing device 200 discussed below with reference to FIG. 2.

Network 110 typically includes a publically accessible network such as the internet, but other networks (including private networks) can be used. Thus, network 110 is typically a collection of networks (and gateways) that typically use a TCP/IP suite of protocols for packet-based communications. The internet typically employs high-speed data communication lines between major nodes or host computers, but even bandwidth between the major nodes is subject to degradation through satellite outages, hardware faults, denial of service attacks, oversubscription of services, and the like. The network connections are shown for the purpose of illustration, and other ways of establishing a communications link between computers (such as using firewalls, as discussed below) can be used.

Consumers 120, 130, and 140 access the network 110 to access networked service providers of services such as service provider 150, third party resource provider 160, cellular communications provider 170, and data storage provider 180. Service provider 150 accesses network 110 via communication link 152, whereas third party resource provider 160 accesses network 110 via communication link 162. Cellular communications provider 170 accesses network 110 via communication link 172 and provides, for example, further connectivity to cellular devices 176 via a cellular network 174. Data storage provider 180 accesses network 110 via communication link 182 to provide, for example, secure backup systems for consumer 120 data. The actual data processing systems of network system 100 may include additional servers, clients, peers, and other devices not illustrated. Each of the service provider 150, third party resource provider 160, cellular communications provider 170, cellular devices 176, and data storage provider 180 can be (or internally provide functions of) the (illustrative) computing device 200 discussed below with reference to FIG. 2.

Figure 2:
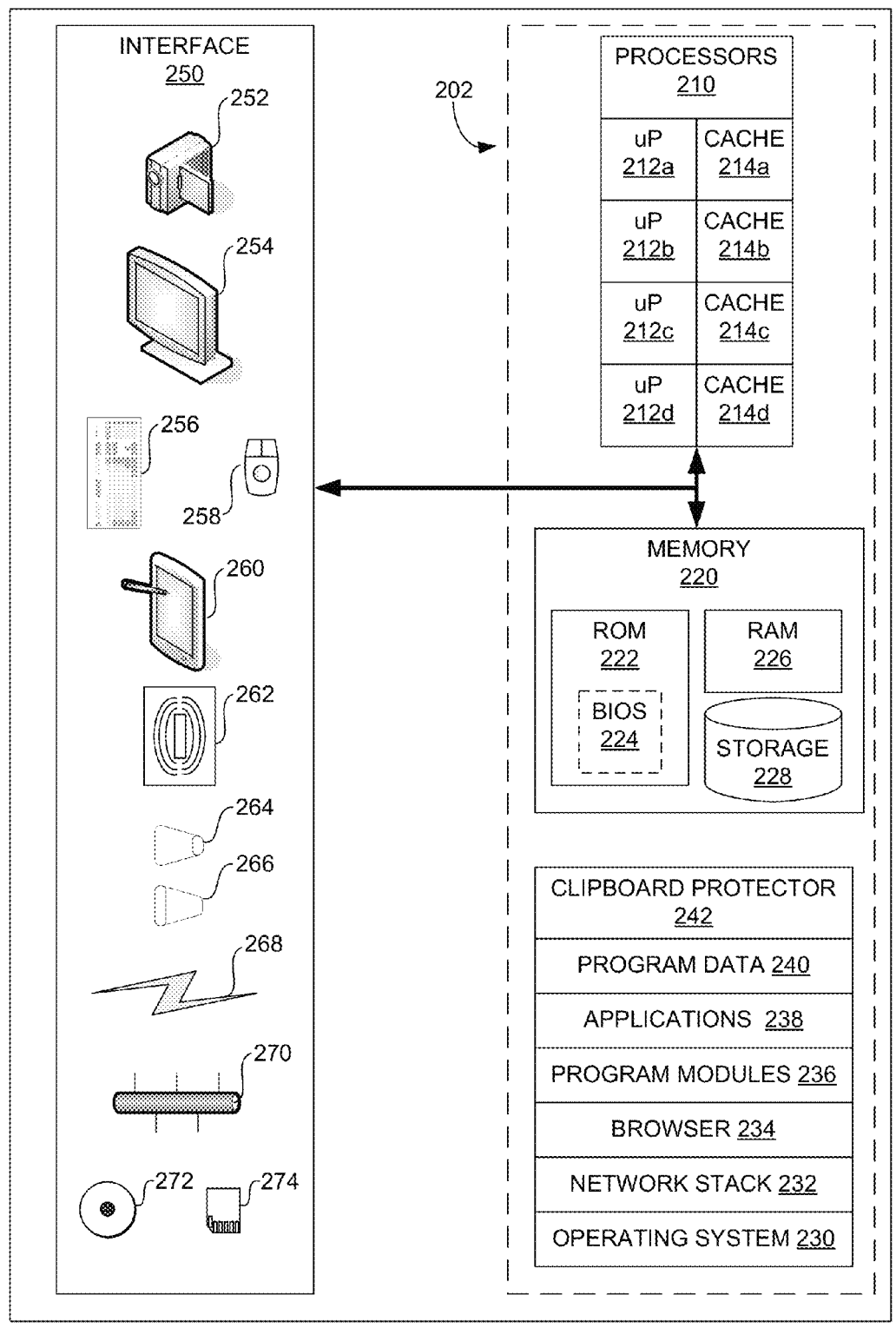
FIG. 2 shows an illustrative computing device in accordance with exemplary embodiments of the disclosure.

FIG. 2 shows an illustrative computing device 200 in accordance with exemplary embodiments of the disclosure. For example, the computing device 200 includes a processing system 202 that is arranged to perform specific tasks in response to applications 238 and program data 240. Processing system 202 is often incorporated into a computing device such as a mobile device, a personal digital assistant, a personal computer, a dedicated web-enabled appliance, a kiosk terminal, automotive electronics, or any other type of networked electronic system or subsystem.

The processing system 202 includes processors 210 and memory 220. Processors 210 may include one or more microprocessor (uP) cores 212a, 212b, 212c, and 212d, each of which is optionally coupled to a respective, local cache 214a, 214b, 214c, and 214d. Memory 220 includes a ROM (read-only memory) 222, RAM (random-access memory) 226, and storage 228 (such as a "hard" disk). ROM 222 optionally includes BIOS (basic input/output system) 224, which typically includes low-level firmware-based drivers for accessing, for example, low-level, hardware-based elements of computing device 200.

Memory 220 includes instructions and data for executing (software) applications 238 (for example), that when executed by processing system 202, perform any suitable function associated with the computing device 200. For example, the processing system 202 executes software (including firmware) and data components such as operating system 230, network stack 232, browser 234, program modules 236, applications 238, program data 240, and clipboard protector 242.

Processing system 202 is accessible to users and non-local components using interface 250. Interface 250 provides a user interface that is typically arranged to provide output to and receive input from the user during the execution of the software applications 238. The output to the user is provided by devices such as the display 254 (including indicator lights and image projectors), a speaker 264, vibrations 262, and the like. The input from the user is received using keyboard 256, mouse (and/or trackball) 258, touch/stylus screen 260, audio input 266 and/or video input 252. Other devices can be used such as keypads, switches, proximity detectors, and the like.

The interface 250 is also arranged to transmit communications to and from other computers across a network. Wireless link 268 permits communications using a modulated optical and/or electromagnetic carrier (such as cellular telephone communications). Cabled link 270 permits communications over a wired and/or optical link (such as optical Ethernet and/or Ethernet). The wireless link 268 and cabled link 270 are optionally employed between other network-enabled devices to establish wide-area networks, local-area networks, private networks, and the like. Additionally, tangible media such as disk 272 or "flash" ROM 274 (and the like) are used to store data and instructions and are read from and/or written to by interface 250 in the course of execution of the clipboard protector 242, for example.

Figure 3:
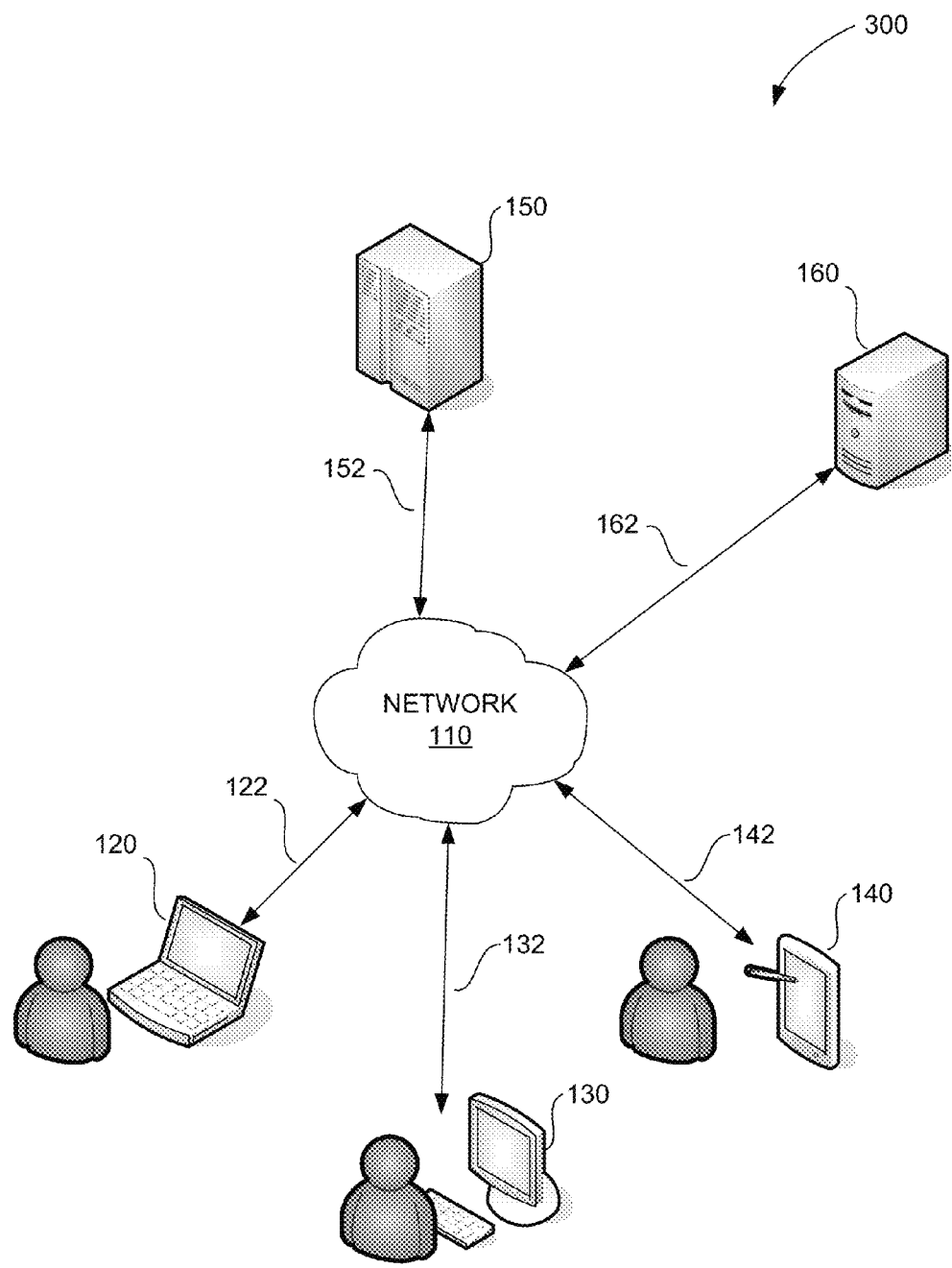
FIG. 3 is a network diagram illustrating a network that includes clipboard protection in accordance with exemplary embodiments of the disclosure.

FIG. 3 is a network diagram illustrating a network that includes clipboard protection in accordance with exemplary embodiments of the disclosure. Network system 300 includes service provider 150 and third party resource provider 160, as discussed above. Service provider 150 is arranged to provide web content (such as services, data and/or applications, and the like) to consumer 120 via network 110. The content and services are generally provided in the form of communications such as webpages, where the webpages (and other communications) often contain references (e.g., "links") to "external" resources that are to be provided by the third party resource provider 160.

Service provider 150 is a server (or a set of servers that are presented as a single server or a "virtual" server for processing requests). The consumers 120, 130, and 140 are typically clients with respect to the server (e.g., service provider 150). The consumers 120, 130, and 140 are, for example, personal computers or network computers.

The clipboard protector 242 of consumer 120 is arranged to reduce or prevent, for example, sending information extracted from the clipboard to a (possibly hacked or otherwise potentially dangerous) third party resource provider 160. The clipboard protector 242 is optionally arranged to initiate sending a warning signal when an element of the clipboard is accessed more than once.

Figure 4:
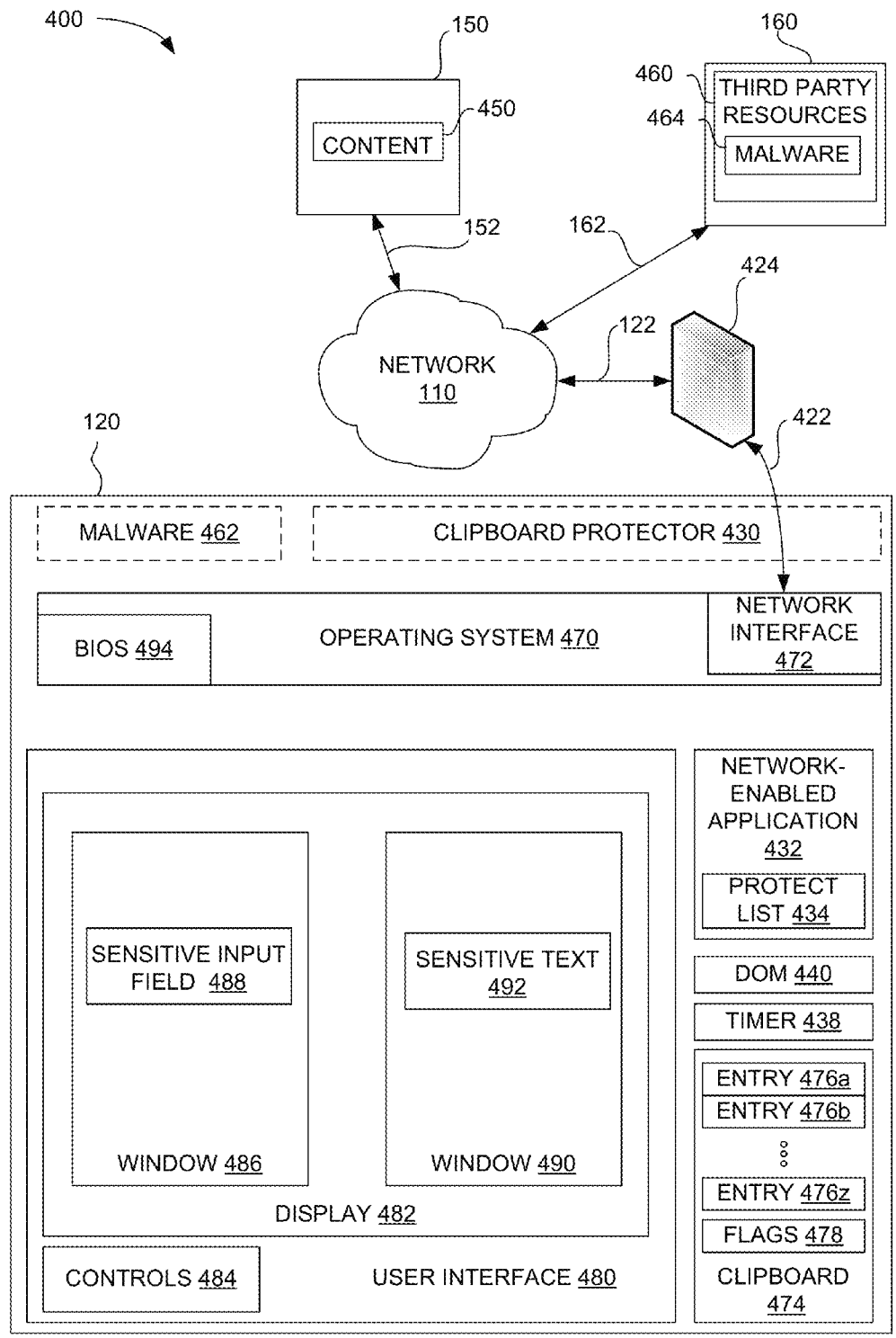
FIG. 4 is a logic diagram illustrating a clipboard protector in accordance with exemplary embodiments of the disclosure.

FIG. 4 is a logic diagram illustrating a clipboard detector in accordance with exemplary embodiments of the disclosure. Network system 400 includes, for example: consumer 120, service provider 150, and third party resource provider 160. Consumer 120 is arranged to (more securely) communicate with network 110 using communication links 122, firewall 424, and communication link 422.

Consumer 120 typically includes a network-enabled application 432 that is arranged to conduct communications between service provider 150 and consumer 120. For example, network-enabled application 432 includes a standards-compliant browser such as Chrome, Firefox, Internet Explorer, and the like. A user enters a URL (universal resource locator) or IP (internet protocol) address to select content 450 (or a portion thereof) hosted by service provider 150. The selection is relayed by the browser via the network 110 to the addressed service provider (e.g., service provider 150) having the selected content.

Service provider 150 responds by sending a communication to the consumer 120. The communication is received by the network interface 472 of operating system 470 and the communication is passed to the network-enabled application 432 for decoding and, for example, displaying in the display 482.

The communication is often a webpage written in a markup language, although other formats can be used such as a style sheet, JavaScript reference, and the like. The webpage often contains references to content provided by the service provider 150 as well as content provided by one or more third party resource providers 160. The references in the received communication are, for example, instantiated by a DOM (document object model) 440 as the network-enabled application 432 parses the received communication in accordance with the format used to encode the information encoded in the received communication.

As the network-enabled application 432 parses the received communication, the network-enabled application 432 constructs the DOM 440 that delineates the structure and the function of the encoded information. The DOM 440 is arranged to load requested third party resources 460, for example, to be used to manage a window 486 of a webpage (conveyed by the encoded information) for display in the display 482 (typically via BIOS 494 of the operating system 470). The display 482 is used to provide visual indications to a user and to prompt the user for input. The user input is captured using controls 484 (such as by a keyboard and/or a mouse) of the user interface 480.

Windows 486 and 490 are (e.g., computer program) application windows that are arranged to display program output and to help capture user input. Window 486 is, for example, a window of a network-enabled application 432 and includes a sensitive input field 488 that is arranged to capture sensitive input information from a user of consumer 120. The sensitive input field 488 is included in the received communication by the service provider 150 to, for example, receive information such as passwords or credit card numbers to authenticate the user and/or receive payment for goods and services provided by the service provider 150.

In response to the displayed sensitive input field 488, the user enters the requested information, usually by typing on a keyboard. Because of the inconvenience of typing and/or remembering long strings of alphanumeric text, many users often rely upon an electronic document in which they store sensitive information for different online services and accounts. Typically the user selects text (such as sensitive text 492) that is displayed in an application window (such as window 490) that is used to display the electronic document that is used to store the sensitive information.

To copy the text, the user can enter a command such as "control-c" on a keyboard to insert the selected sensitive text 492 into an entry 476 of the clipboard 474 in a keyboard shortcut. The clipboard 474 is a memory buffer that is arranged to provide easy-to-access storage for a user. The clipboard includes one or more entries (such as entries 476*a*, 476*b* . . . and 476*z*) such that the user is provided convenient access to the one and/or more selected entries in the clipboard 474. The one and/or more entries 476 (which are individually and collectively referred to herein as "entry 476" or "entries 476") can be arranged to store the data in-place or as a list of pointers wherein each pointer points a data object that is stored as an entry.

To paste the selected sensitive text 492 into the sensitive input field 488, the user can enter a command such as such as "control-v." However, the entry 476 conventionally remains available for subsequent paste operations and is potentially vulnerable to exploits by malware 462 that are operating on consumer 120 as installed by malware 464 of third party external resources 460. The malware 462 can be in the form of both traditional executable malware 462 as well as programs such as JavaScript malware (where the malware 462 might try to access the sensitive information by sampling the entries 476 of the clipboard 474).

Malware 462 can gain access to the consumer 120 in a number of different ways. For example, the encoded information can include a reference to a resource (such as an apparent advertisement) that is not provided (directly) by the service provider 150. The reference is generally provided in the form of a link (such as a URL or IP address) that is used to retrieve the external reference (third party resources 460 hosted by third party resource provider 160, for example). Even though the external reference might have been approved by the service provider at one time, the external reference is subject to being redirected or even obtained by a beneficiary of the malware 462. Thus, the malware 462 can be installed by network-enabled application 432 through loading the referenced external reference in the third party resources 460.

To help prevent (and/or reduce) exploitation of the clipboard 474 by malware 462, the clipboard protector 430 (which is a clipboard protector such as clipboard protector 242) generates a warning signal that is used, for example, to reduce and/or prevent the appearance of multiple pastes from the clipboard 474 from an entry 476 containing the sensitive text. The warning signal is generated in response to, for example, a user entering the keyboard combination of "control-shift-c" to instruct the clipboard 474 that the selected object to be copied holding the sensitive text (for example) is to be pasted only one time. Accordingly, clipboard 474 sets a flag 478 that is associated with an entry 476 holding the sensitive text such that upon a paste operation that inserts the selected entry 476 (containing the sensitive text) is to be pasted only one time.

After the entry 476 holding the sensitive text is pasted (in response to a "control-v" operation, for example), the entry 476 (as compared to the entire clipboard 474, for example) is deleted, re-flagged, or otherwise disposed to prevent and/or reduce inclusion in subsequent paste operations (for example, a pointer to an area of memory allocated for storage of the entry 476 can be re-allocated such that the memory location formerly reserved for the entry 476 cannot be accessed again). When the location of the clipboard is predictable (for example), the area of memory allocated for storage of the entry 476 can be overwritten with other data (that is arbitrary data or otherwise) such that the protected information cannot be accessed by reading from the same (physical or logical) memory location for the entry 476.

Likewise, applications, such as browsers, can access the clipboard protector 430 by adding to and/or replacing functionality often provided by the operating system 470. Applications can operate (at least to a degree) independently of the operating system 470 (such as by assigning keyboard commands that are "in focus" when a user is operating controls 484 to execute the clipboard-related commands). Accordingly, a browser application can operate in conjunction with (and/or incorporate features of) the clipboard protector 430. For example, a "paste and go" operation can be augmented to provide a "paste, go and clear clipboard" operation or a "paste and clear clipboard" operation. Thus, the application can clear an entry 476 (and/or the entire clipboard 474), without relying upon the operating system 470 to specifically provide the functionality to specifically block access to (and/or delete) the sensitive information. Access to the entry can be blocked by, for example, clearing pointers to the entry, clearing the entry by deleting, erasing, and/or overwriting the entry, and the like. (Clearing pointers and entries includes changing the values thereof with values that are typically different from the original values.)

The warning signal is also generated in response to, for example, a user entering the keyboard combination of "control-shift-v" (or other such combination convenient for a user) to paste a selected entry 476 (containing the sensitive text, for example). Accordingly, clipboard 474 allows a single paste operation that inserts the selected entry 476 (containing the sensitive text) by pasting the selected entry 476 (only one time) in the sensitive input field 488. After the entry 476 holding the sensitive text is pasted the first time, the entry 476 is deleted or otherwise disposed to prevent and/or reduce inclusion in subsequent paste operations.

Likewise, the warning signal is also generated in response to, for example, an indication received by the network-enabled application 432 that objects to be entered via the sensitive input field 488 are to be protected. The indication may be present in the content 450 received from the service provider 150. Any indication (and/or a collection of indications) can be used to support a determination that the objects (e.g., and the information thereof) is to be protected. For example, the sensitive input field 488 can be associated with metadata that identifies the data (to be inserted) of the sensitive input field 488 as being credit card data (and/or password information). Accordingly, an identification of an HTML input box being of type "password" can be used to provide the indication that any text to be entered into the HTML input box of type "password" is to be protected. (The password type of "HTML input box" normally causes the displayed image of entered text to be replaced with asterisks and used to accept passwords, secret answers, and the like.)

Another indication that any text to be entered is to be protected is by examining the state of an environment variable (such as when autocomplete="off") that reflects the intent of a programmer that the entered information is sensitive information. Thus, any constructs that are created in the standards of HTML, XHTML, and the like that, when used, provide an indication that the information is to be treated as sensitive information. (For example, a standards-supplied construct used to provide a "credit card" input field type can be used to provide an indication that any text to be entered therein is to be protected.)

In response to an indication that sensitive objects are to be protected, the network-enabled application 432 generates a warning signal in response to a paste operation being performed in to the sensitive input field 488 that is used by the clipboard protector 430 to allow the clipboard 474 to complete the paste operation, after which the entry 476 is deleted or otherwise flagged and/or disposed to prevent and/or reduce inclusion in subsequent paste operations.

The network-enabled application 432 includes a protect list 434. The protect list 434 typically includes a list of syntactical elements such as objects, identifiers, and/or rules for identifying objects that are to be protected (against multiple paste operations, for example). For example, when the sensitive input field 488 is used as a password input field, the network-enabled application 432 consults the protected list 434 to determine whether the identification of the sensitive input field 488 is a "password input field." When protected list 434 provides an indication that the text is to be protected, the network-enabled application 432 generates the warning signal for protection against multiple paste operations. Thus, the data being pasted into the sensitive input field 488 is identified as being sensitive data in response to the determination that the type of the sensitive input field (e.g., password input field) 488 is included in the protect list 434.

In another example, the language used to encode the webpage is used to identify an object for which enhanced security precautions apply. For example, a "protect" function is encoded as such in the language that identifies an object for which protection against multiple-paste operations is provided for the paste-buffer entry that is pasted into the identified object. When the identified object that is to be protected has an entry 476 from the clipboard 474 that is being pasted into the identified object (such as sensitive input field 488), the network-enabled application 432 generates a warning signal for protection against multiple paste operations so that the data being pasted into the sensitive input field 488 is flagged as being no-longer pasteable and/or deleted from the clipboard 474.

In yet another example, the context of syntactical elements of the webpage into which the entry 476 is being pasted is analyzed to determine whether an indication exists that the entry 476 to be pasted into an input field is to receive enhanced security precautions. The document title (and location within a file structure) as well as the context of the objects (such as text attributes that include words such as "password," "credit card," "bank account," "Social Security Number," and the like) from the webpage itself provides an indication that the clipboard 474 entry 476 is to protected against multiple paste operations.

The application itself and/or the operating system can be used to detect the presence (and/or an indication) of potentially sensitive information, such as patterns that look like social security numbers or credit card numbers. When an indication is encountered, the user can be queried to determine if the user would like to clear the related entry 476 in the clipboard 474 after pasting. The sensitive information in the entry 476 in the clipboard 474 can be automatically cleared (and/or blocked) after pasting when the when the application and/or operating system can assemble relatively strong indications that the information is sensitive (such as the presence of a connection to a digital wallet, the use of a secure socket layer associated with a form that includes an input field, and the like).

In a further example, the syntax (including the context) of the data being copied (as well as any associated metadata for the object captured in the clipboard 474, for example) is evaluated to determine the type of data in entry 476 that is to be pasted. For example, the entry 746 is evaluated to determine the presence of a word that includes exactly three numbers followed by a dash followed by exactly two-numbers followed by a dash followed by exactly four numbers (which is an indication that the text is a Social Security Number). When the syntax provides an provides an indication that the clipboard 474 entry 476 is to protected against multiple paste operations, the network-enabled application 432 generates a warning signal for protection against multiple paste operations so that the data being pasted into the sensitive input field 488 is flagged as being no-longer pasteable and/or deleted from the clipboard 474.

Likewise, data that is associated with a generated warning signal can be used to likewise generate warning signals when the same data is encountered again. A digital signature of each entry for which a warning signal has been generated is made (using a one-way hash function, for example), with each signature then being stored in the protect list 434. (The digital signature can be generated and stored in response to the warning signal.) When a pasteable item is freshly entered into (and/or about ready to be pasted from) the clipboard 474, a digital signature is performed and compared with the digital signatures of the entries for which (multiple-pasting) warning signals are to be generated. When a match of the digital signatures exists, the network-enabled application 432 (or operating system, or other, non-browser application, for example) generates a warning signal for protection against multiple paste operations so that the data being pasted into the sensitive input field 488 is flagged as being no-longer pasteable and/or deleted from the clipboard 474.

The protect list 343 is used to store either (or both) the copied data or a signature of the copied data as an item in a protect list in response to the received indication that the copied data is sensitive information to be protected. A warning signal that subsequently copied data (of a subsequent copy operation, for example) is sensitive information to be protected is generated in response to the inclusion of the subsequent copied data or a signature of the subsequent copied data as an item in the protect list. Accordingly, the entry protect status associated with current copied data (to be added to or pasted from the clipboard, for example) is changed in response to a match between the currently copied data in a current copy and/or paste operation and previously copied data in a previous copy and/or paste operation for which an entry protect has previously been changed. The changing of the entry protect status also comprises creating a new protect status entry when no previous entry protect status has been associated with the current copied data. Thus, changing the entry protect status comprehends both creating a new protect status entry (e.g., by initializing the entry protect status to a blocking status) when no entry protect status has been associated with the current copied data, and also comprehends modifying an existing entry protect status to a blocking status that has been associated with the current copied data.

The warning signal can be used in combination with the status of other conditions to determine whether to apply multiple-paste operation blocking. For example, when consumer 120 goes offline (and shows no active internet connections), the multiple-pasted blocking operation can query (through an alert window, for example) the user as to whether a subsequent paste operation of data that is associated with an indication of being sensitive data should be permitted to be used for subsequent paste operations.

Likewise, a timer can be used such that after expiry of the timer, the paste operation (including the first time the data is to be pasted) can be blocked (including blocking by querying the user as to whether the paste operation should be allowed to proceed). The timeout operation for pasting copied data can be determined by determining the elapsed time (from the present time to the time in which the data was copied into the clipboard 474 or pasted the first time). For example, entering a control-shift-c opens a limited window of time in which the protected data can be copied without being blocked (or deleted from the clipboard 474, for example).

Figure 5:
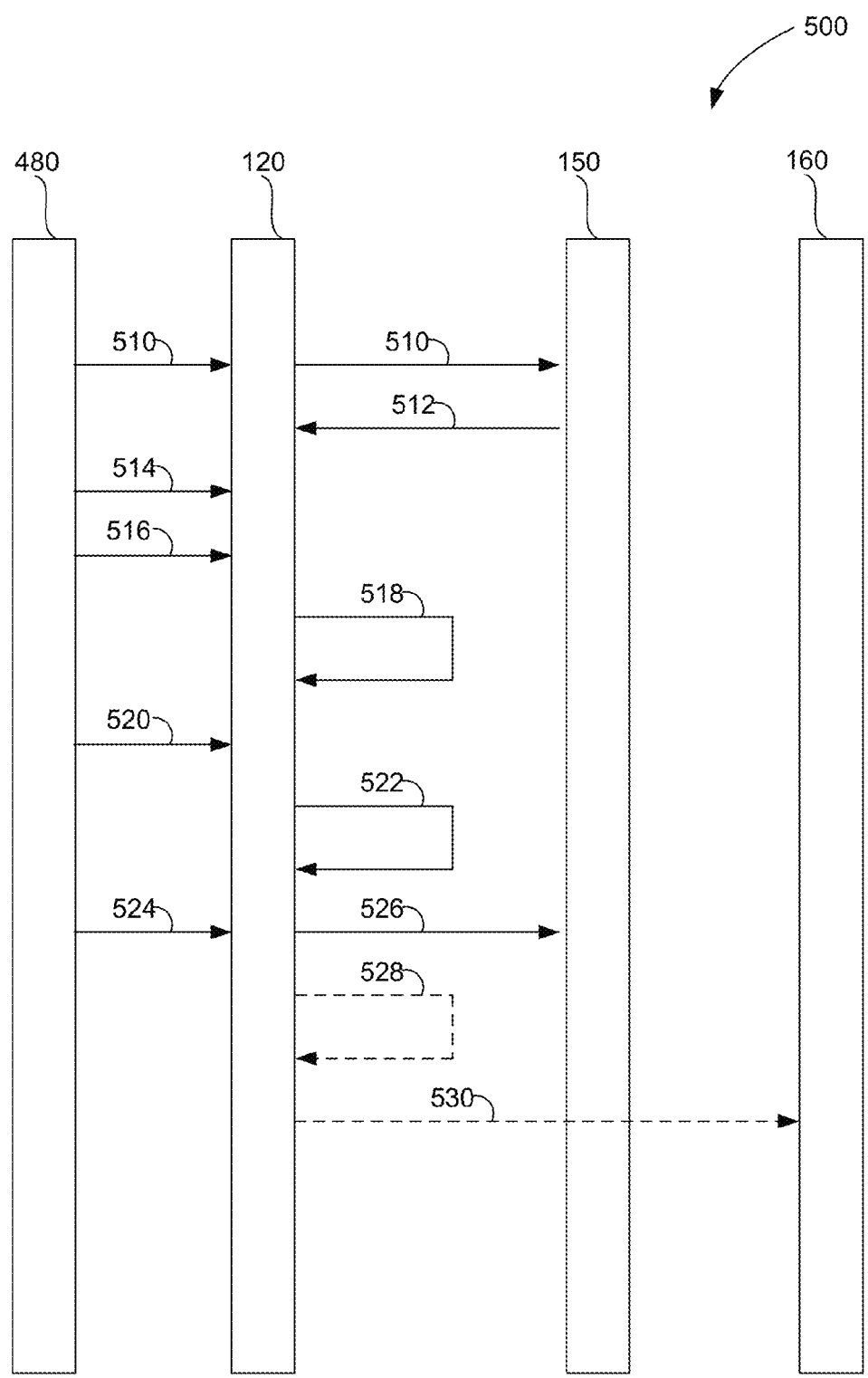
FIG. 5 is a signaling diagram illustrating clipboard protection in accordance with exemplary embodiments of the disclosure.

FIG. 5 is a signaling diagram illustrating clipboard protection in accordance with exemplary embodiments of the disclosure. Signaling diagram 500 illustrates communications transmitted and received between and amongst the user interface 480, for example, consumer 120, service provider 150, and third party resource provider 160. A user at user interface 480 of consumer 120 generates a request 510 for content (or other services) from service provider 150. In response, service provider 150 transmits a communication 512 via an external network wherein the first communication includes an object (such as sensitive input field 488) for requesting and receiving sensitive information from the user at user interface 480. The sensitive information can include information such as login information, money payment information, and the like.

When the communication 512 is received and parsed (for example), consumer 120 constructs (for example) a DOM 440 that determines the structure and function of window 486. Window 486 includes a sensitive input field 488 that is arranged to receive the sensitive information. The user at user interface 480 (who might not be able to recall or might not want to manually enter each character of the sensitive information) opens, for example, a document containing the requested sensitive information via request 514. The consumer 120 opens the requested document and displays the contents (e.g., containing the requested sensitive information) as sensitive text 492 of window 490. At that time, a user at user interface 480 selects the sensitive text 492 and generates a command 516 for copying the selected text into an entry 476 of a clipboard 474. In response, the consumer 120 copies the information into an entry 476 of a clipboard 474 in operation 518.

A user at user interface 480 then directs the insertion point to the, for example, sensitive input field 488 and generates a command 520 for pasting the selected entry 476 of the clipboard 474 into the sensitive input field 488. The user can indicate that the selected text is sensitive (and thus to be limited to exactly one paste operation) by using a special paste command (such as control-shift-v). The user can likewise use a special copy command (such as control-shift-c) to set a protect status flag 478 that is associated with the entry 476 of the clipboard 474 that contains the sensitive information that is to be protected. In response to the command 520, the consumer 120 verifies that the selected entry 476 has not yet been pasted and permits the insertion of the selected entry into the sensitive input field 488 in operation 522. Typically the user at user interface 480 "enters" the information via command 524, which is then forwarded by consumer 120 to service provider 150 as communication 526.

When malware 462, for example, installed on consumer 120 tries to access the selected entry by "pasting" from the clipboard (as in operation 528), consumer 120 detects that the sensitive information has already been pasted and thus blocks the attempted operation 528. Thus, the malware 462 is unable to package and send via communication 530 the sensitive information derived from the clipboard 474 to the third party resource provider 160 or other points that are unknown and/or distrusted.

In an exemplary embodiment, the clipboard protector 430 does not block subsequent pastes of sensitive information unless, for example, the clipboard protector 430 detects malware 462 and/or receives an indication that malware 462 has been detected.

Even though the operation of the clipboard 474 is described herein with reference to containing text within each entry 476, other forms of stored information (such as an image of a signature) can be stored in the various entries 476 of clipboard 474. Likewise, sensitive documents being transferred from directory-to-directory (or from server-to-server, for example) using RDP (remote desktop protocol) can be stored in the various entries 476 of clipboard 474 can be protected by the clipboard protector 430 in accordance with the teachings disclosed herein.

The various exemplary embodiments described above are provided by way of illustration only and should not be construed to limit the claims attached hereto. Those skilled in the art will readily recognize various modifications and changes that could be made without following the example exemplary embodiments and applications illustrated and described herein, and without departing from the true spirit and scope of the following claims.

The invention claimed is:

1. A method of protecting data in a clipboard in an electronic system, comprising:
changing an entry protect status associated with a clipboard entry that is arranged to store copied data, the entry protect status being changed to indicate the entry protect status is set to block access to the copied data; and
selectively blocking access to the copied data for which the entry protect status has been changed, wherein access to the copied data for which the entry protect status has been changed is selectively blocked by allowing a first paste operation to paste in a first location the copied data for which the entry protect status has been changed and by blocking successive paste operations that are arranged to paste the copied data for which the entry protect status has been changed, wherein the blocked successive paste operations are arranged to be blocked from pasting in a second location that is different from the first location.

2. The method of claim 1, wherein the second location is associated with a process having code received in a communication from a networked service provider that is networked to the electronic system.

3. The method of claim 2, wherein the code received in the communication from the networked service provider that is networked to the electronic system is executed during a network session in which the received code was received, wherein access to the copied data for which the entry protect status has been changed is selectively blocked by querying a user of the electronic system as to whether a successive paste operation that is arranged to paste the copied data for which the entry protect status has been changed is to be blocked.

4. The method of claim 3, wherein the entry protect status associated with a clipboard entry that is arranged to store copied data is changed in response to a user-generated command generated by the user, wherein the user-generated command includes a command to copy data to or from an entry of the clipboard.

5. The method of claim 4, wherein the copying data into an entry of the clipboard of the electronic system includes selecting one of a plurality of entries in the clipboard into which the data is to be copied, wherein each of the plurality of entries in the clipboard into which the data is to be copied is respectively associated with a protect status.

6. The method of claim 5, wherein the successive paste operations that are arranged to paste the copied data for which the entry protect status has been changed are blocked after the data is copied into or from the clipboard entry associated with the changed entry protect status, wherein the access to the copied data for which the entry protect status has been changed is selectively blocked by deleting the copied data from the clipboard after a limited window of time has elapsed from the time the copied data was copied or pasted.

7. The method of claim 6, wherein the entry protect status associated with a clipboard entry that is arranged to store copied data is changed in response to comparison of words in the received communication with a protect list stored on the electronic system, wherein the protect list includes a list of syntactical elements that is arranged to identify objects that are to be protected, wherein the entry protect status associated with currently copied data is changed in response to a match between the currently copied data in a current copy and/or paste operation and previously copied data in a previous copy and/or paste operation for which an entry protect has previously been changed.

8. A non-transitory computer readable medium including instructions that, when executed on a processor of an electronic system, protect data in a clipboard, comprising:
   changing an entry protect status associated with a clipboard entry that is arranged to store copied data, the entry protect status being changed to indicate the entry protect status is set to block access to the copied data; and
   selectively blocking access to the copied data for which the entry protect status has been changed, wherein access to the copied data for which the entry protect status has been changed is selectively blocked by allowing a first paste operation to paste in a first location the copied data for which the entry protect status has been changed and by blocking successive paste operations that are arranged to paste the copied data for which the entry protect status has been changed, wherein the blocked successive paste operations are arranged to be blocked from pasting in a second location that is different from the first location, and wherein the second location is associated with a process having code received in a communication from a networked service provider that is networked to the electronic system.

9. The medium of claim 8, wherein the access to the copied data for which the entry protect status has been changed is selectively blocked by deleting the copied data from the clipboard after a limited window of time has elapsed from the time the copied data was copied or pasted.

10. The medium of claim 8, wherein the entry protect status associated with a clipboard entry is changed in response to a user-generated command generated by the user while pasting the copied data.

11. A web browsing system, comprising:
   a network-enabled application of a content user that is arranged to receive a communication from a networked service provider that describes the structure and functionality of content of the communication that is received by the content user;
   an electronic clipboard arranged in the content user that includes memory coupled to a processor or hardware, wherein the electronic clipboard is arranged to store copied data in an entry of the electronic clipboard and to paste the copied data into a process of the network-enabled application; and
   a clipboard protector that is arranged to receive a protect indication that the copied data is sensitive information to be protected, and is arranged to block access to the indicated copied data in response to the associated protect, wherein access to the copied data for which the protect indication has been received is selectively blocked by allowing a first paste operation to paste in a first location the copied data for which the protect indication has been received and by blocking successive paste operations that are arranged to paste the copied data for which protect indication has been received, wherein the blocked successive paste operations are arranged to be blocked from pasting in a second location that is different from the first location, and wherein the second location is associated with a process having code received in a communication.

12. The system of claim 11, wherein the clipboard protector is arranged to change a protect status associated with the entry storing the indicated copied data in response to the protect indication.

13. The system of claim 11, wherein the electronic clipboard is arranged as a process of the network-enabled application.

14. The system of claim 11, wherein the received protect indication is received in response to a user-generated command generated by the user while copying data selected to be the copied data.

15. The system of claim 11, wherein the received protect indication is received in response to an indication received in the received communication from the networked service provider.

16. The system of claim 11, wherein the electronic clipboard is arranged to include a protect status for each of a plurality of clipboard entries, wherein each clipboard entry includes separately copied data that is copied by the user performing separate copy operations.

17. The system of claim 11, wherein the received protect indication is received in response to comparison of words in the received communication with a protect list stored on the electronic system, wherein the protect list includes a list of syntactical elements that is arranged to identify objects that are to be protected.

18. The system of claim 11, comprising a protect list in which the copied data is stored as an item in a protect list in response to the received indication that the copied data is sensitive information to be protected, wherein an indication that subsequently copied data is sensitive information to be protected is generated in response to the inclusion of the subsequently copied data as an item in the protect list.

19. The system of claim 11, comprising a protect list in which a signature of the copied data is stored as an item in a protect list in response to the received indication that the copied data is sensitive information to be protected, wherein an indication that subsequently copied data is sensitive information to be protected is generated in response to the inclusion of the signature of the subsequently copied data as an item in the protect list.

20. The system of claim 11, wherein the clipboard protector is arranged to block access to the indicated copied data by clearing the indicated copied data from the entry of the electronic clipboard.

* * * * *